US008380699B2

(12) United States Patent
Al-Omari et al.

(10) Patent No.: US 8,380,699 B2
(45) Date of Patent: Feb. 19, 2013

(54) SYSTEM AND METHOD FOR OPTIMIZING QUERIES

(75) Inventors: Awny K. Al-Omari, Cedar Park, TX (US); Hansjorg Zeller, Los Altos, CA (US); Tom C. Reyes, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 12/554,254

(22) Filed: Sep. 4, 2009

(65) Prior Publication Data

US 2011/0060731 A1    Mar. 10, 2011

(51) Int. Cl.
    G06F 17/30    (2006.01)
(52) U.S. Cl. ......... 707/713; 707/718; 707/719; 707/769
(58) Field of Classification Search .............. 707/713, 707/718, 764, 769, 797, 719, 721, 790, 821
See application file for complete search history.

(56) References Cited

U.S. PATENT DOCUMENTS

| | | | |
|---|---|---|---|
| 5,325,525 A | 6/1994 | Shan et al. | |
| 6,263,331 B1* | 7/2001 | Liu et al. ................ | 707/999.003 |
| 6,604,102 B2 | 8/2003 | Klein et al. | |
| 7,010,516 B2 | 3/2006 | Leslie | |
| 7,076,477 B2 | 7/2006 | Lin et al. | |
| 7,343,370 B2 | 3/2008 | Kosuru et al. | |
| 7,512,600 B2 | 3/2009 | Al-Omari et al. | |
| 2003/0084025 A1* | 5/2003 | Zuzarte ............................ | 707/2 |
| 2004/0010488 A1* | 1/2004 | Chaudhuri et al. .............. | 707/3 |
| 2004/0117359 A1* | 6/2004 | Snodgrass et al. ............... | 707/3 |
| 2004/0172400 A1* | 9/2004 | Zarom et al. .................. | 707/100 |
| 2004/0225639 A1* | 11/2004 | Jakobsson et al. .............. | 707/2 |
| 2005/0138047 A1* | 6/2005 | Liu et al. ....................... | 707/100 |
| 2005/0240624 A1* | 10/2005 | Ge et al. ...................... | 707/104.1 |
| 2005/0267877 A1* | 12/2005 | Chaudhuri et al. ............... | 707/3 |
| 2006/0074635 A1 | 4/2006 | Gilbert et al. | |
| 2006/0218123 A1* | 9/2006 | Chowdhuri et al. ............ | 707/2 |
| 2008/0091642 A1* | 4/2008 | Bestgen et al. .................... | 707/2 |
| 2008/0133458 A1* | 6/2008 | Zabback et al. ................. | 707/2 |
| 2008/0195578 A1* | 8/2008 | Hueske et al. .................... | 707/2 |
| 2008/0215531 A1* | 9/2008 | Markl et al. ..................... | 707/2 |
| 2008/0222092 A1* | 9/2008 | Hueske et al. .................... | 707/2 |
| 2010/0030728 A1* | 2/2010 | Chakkappen et al. ............ | 707/2 |
| 2010/0036805 A1* | 2/2010 | Blamer et al. .................... | 707/3 |
| 2010/0114870 A1* | 5/2010 | Al-Omari et al. ............. | 707/718 |
| 2010/0131490 A1* | 5/2010 | Lamb et al. .................... | 707/714 |
| 2010/0235347 A1* | 9/2010 | Chaudhuri et al. ........... | 707/713 |

OTHER PUBLICATIONS

Oracle, "Oracle Database Performance Tuning Guide, Chapter 19: Using Explain Plan", 2008, 10g Release 2 (10.2), pp. 1-21.*
Avnur, Ron et al., "Eddies: Continuously Adaptive Query Processing," ACM SIGMOD, vol. 29, Issue 2, pp. 261-272 (2000), ACM New York City, NY.
Stillger, Michael et al., "LEO—DB2's LEarning Optimizer," pp. 19-28, Proceedings of the 27th International Conference on Very Large Data Bases, Roma, Italy, Morgan Kaufmann Publishers, Inc., 2001.
Viglas, Efstratios et al., "Novel Query Optimization and Evaluation Techniques," (Dissertation submitted to The University of Wisconsin, 2003), UMI Microform 3101345, Copyright by ProQuest Information and Learning Company, Ann Arbor MI.

(Continued)

*Primary Examiner* — Christyann Pulliam
*Assistant Examiner* — Rezwanul Mahmood (57) ABSTRACT

There is provided a computer-implemented method of optimizing a query. An exemplary method comprises determining a maximum cardinality for an operator. The query may comprise the operator. The exemplary method also comprises determining a plurality of potential implementations for the operator. The exemplary method additionally comprises generating a query plan for the query based on the maximum cardinality and the potential implementations.

16 Claims, 7 Drawing Sheets

OTHER PUBLICATIONS

Viglas, Stratis et al., "Maximizing the Output Rate of Multi-Way Join Queries over Streaming Information Sources," vol. 29, pp. 285-296, Proceedings of the 29th International Conference on Very Large Data Bases, Berlin, Germany, 2003.

Markl, Volker et al., "Robust Query Processing through Progressive Optimization," pp. 659-670, Proceedings of the 2004 ACM SIGMOD International Conference on Management Data, Paris, France, Jun. 13-18, 2004, Published by ACM, New York City, NY (2004).

Babcock, Brian et al., "Towards a Robust Query Optimizer: A Principled and Practical Approach," pp. 119-130, Proceedings of the 2005 ACM SIGMOD International Conference on Management of Data, Jun. 14-16, 2005, Baltimore, Maryland, Published by ACM, New York City, NY (2005).

Babu, Shivnath et al., "Proactive Re-optimization with Rio," pp. 936-938, Proceedings of the 2005 ACM SIGMOD International Conference on Management of Data, Jun. 14-16, 2005, Baltimore, Maryland, Published by ACM, New York City, NY (2005).

* cited by examiner

| PREDICATE | MAXIMUM SELECTIVITY ESTIMATE |
|---|---|
| ANY PREDICATE WHERE THE HISTOGRAM IS NOT AVAILABLE | 1.0 |
| X = CONSTANT | If maximum frequency available in histogram 136, (maximum frequency of the interval in which the constant value falls) / (total rows in table) If maximum frequency not available, (number of rows in interval – number of values in interval + 1) / (total rows) |
| X <> CONSTANT | 1.0 |
| X > CONSTANT | (sum of cardinality of all histogram intervals with values > constant) / (total rows) |
| X >= CONSTANT | (sum of cardinality of all histogram intervals with values >= constant) / (total rows) |
| X < CONSTANT | (sum of cardinality of all histogram intervals with values < constant) / (total rows) |
| X <= CONSTANT | (sum of cardinality of all histogram intervals with values <= constant) / (total rows) |
| X = VALUE UNKNOWN AT COMPILE TIME | (maximum frequency for column X) / (total number of rows) |
| X <> VALUE UNKNOWN AT COMPILE TIME | 1.0 |
| X > VALUE UNKNOWN AT COMPILE TIME | 1.0 |
| X >= VALUE UNKNOWN AT COMPILE TIME | 1.0 |
| X < VALUE UNKNOWN AT COMPILE TIME | 1.0 |
| X <= VALUE UNKNOWN AT COMPILE TIME | 1.0 |
| X IS NULL (FOR NULLABLE X) | (number of rows in null interval) / (total rows) |
| X IS NOT NULL (FOR NULLABLE X) | (total rows - number of rows in null interval) / (total rows) |
| X IS NULL (FOR NON-NULLABLE X) | 0 |
| X IS NOT NULL (FOR NON-NULLABLE X) | 1.0 |
| X = Y | 1.0 |
| PREDICATE 1 AND PREDICATE 2 | Minimum(selectivity of PREDICATE 1, selectivity of PREDICATE 2) |
| PREDICATE 1 OR PREDICATE 2 | Minimum(selectivity of PREDICATE 1 + selectivity of PREDICATE 2, 1.0) |

FIG. 5

| Operator | Join Predicate (example) | Maximum Cardinality Estimate | Explanation |
|---|---|---|---|
| Join (T1, T2) | none | maxCard(T1) * maxCard(T2) | Cross product |
| | T1.x=T2.y | minimum(maxCard(T1) * maxFreq(T2.y), maxCard(T2)*maxFreq(T1.x)) | Assuming all rows from T1 match the most frequent value for T2.y (or vice versa), the maximum cardinality estimate may be the smaller of the two bounds |
| | T1.x1=T2.y1 and T1.x2=T2.y2 ... and T1.xn=T2.yn | minimum(maxCard(T1) * maxFreq(T2.y1...yn), maxCard(T2) * maxFreq(T1.x1...xn)) | The maximum cardinality estimate may be determined by assuming maximum overlap between the combined join predicates result sets. |
| | T1.x > T2.y | maxCard(T1) * maxCard(T2) | For theta joins where the only join predicate is an inequality between two columns, the cross product estimate may be used as the upper bound of the maximum cardinality estimate. |
| | T1.x1 = complexFunction (T2.y1) | maxCard(T2)*maxFreq(T1.x1) | The maximum cardinality estimate is based on an assumption that all values of a complexFunction(T2.y1) match the most frequent values of T1.x1 |
| Union (T1, T2) | n/a | maxCard(T1) + maxCard(T2) | The maximum cardinality estimate may be based on assumption that there is no intersection between the unioned tables |
| Groupby (T, g1, g2,... gn) (group table T on Columns g1...gn) | n/a | minimum( (maxCard(T) / expCard(T)) * expCard(Groupby(T, g1...)), maxUEC(g1,...,gn)) | Scale the expected group by cardinality by the ratio of max cardinality to expected cardinality of the underlying table. Ensure that max cardinality of GroupBy is capped by UEC of grouping column(s). |
| Transpose(T) | n/a | expCard(Transpose(T)) * (maxCard(T)/expCard(T)) | Scale the expected transpose cardinality by the ratio of max cardinality to expected cardinality of the underlying table. |

FIG. 6

SYSTEM AND METHOD FOR OPTIMIZING QUERIES

BACKGROUND

Many database customers have dynamic workloads that include a variety of queries, such as light processing queries and processing-intensive business intelligence queries. Typically, customers expect quick responses from the light-processing queries. Customers may tolerate some latency in the business intelligence queries if that latency is commensurate with the complexity of the queries.

However, even a single disproportionately-long running query can be a significant problem because a long-running query can consume large amounts of database resources. Generally, disproportionately-long running queries may result from inefficient query plans, which are produced by the database optimizer. Because of the highly disruptive impact of query plans on the overall system, customers may expect the query optimizer to always generate efficient query plans.

Optimizing queries so that all queries run efficiently may be difficult to accomplish on any platform, even on single processor platforms. Optimization may be even more difficult on systems with massively parallel processors (MPP). In MPP systems, the optimizer has the additional tasks of deciding whether to use one, all, or a subset of the processors to run the query plan.

Classic cost-based optimizers may model the costs of alternative query plans and choose the cheapest plan. The cost-based optimizers may base the modeled cost on estimates of how many rows of data (i.e., cardinality estimates) flow through each operator. This strategy may be effective for simple queries in which compile-time estimates of cardinality match actual values for run-time cardinality. However, this strategy may generate disproportionately long-running query plans when compile-time estimates of cardinality deviate from actual run-time values.

BRIEF DESCRIPTION OF THE DRAWINGS

Certain exemplary embodiments are described in the following detailed description and in reference to the drawings, in which:

FIG. 5 is a table showing maximum selectivity estimates for various predicates that may be used in exemplary embodiments.

FIG. 6 is a table showing sample methods for computing maxiumum cardinality that may be used in ecemplary embodiments.

DETAILED DESCRIPTION OF SPECIFIC EMBODIMENTS

Figure 1A:
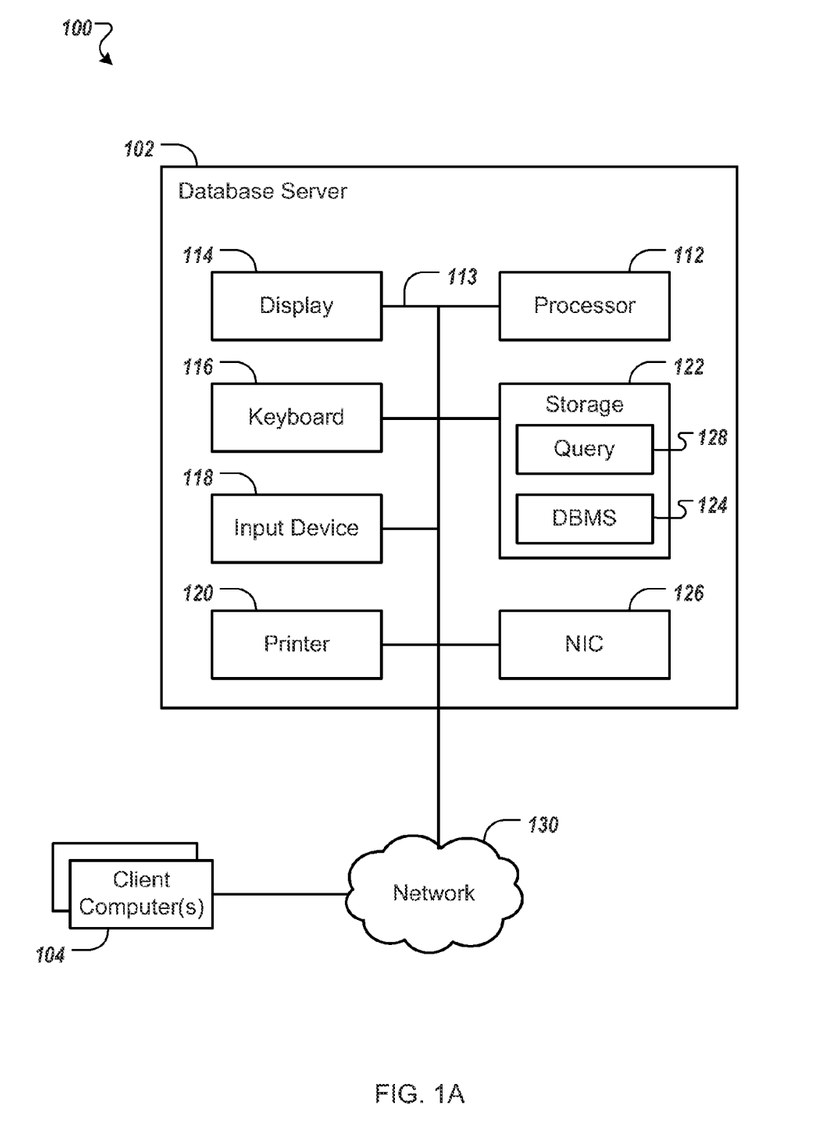
FIG. 1A is a block diagram of a system adapted to optimize a query on a database management system according to an exemplary embodiment of the present invention.

FIG. 1A is a block diagram of a system adapted to optimize a query on a database management system according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include a processor 112 which may be connected through a bus 113 to a display 114, a keyboard 116, one or more input devices 118, and an output device, such as a printer 120. The input devices 118 may include devices such as a mouse or touch screen.

The database server 102 may also be connected through the bus 113 to a network interface card (NIC) 126. The NIC 126 may connect the database server 102 to the network 130. The network 130 may be a local area network (LAN), a wide area network (WAN), or another network configuration. The network 130 may include routers, switches, modems, or any other kind of interface device used for interconnection.

The database server 102 may have other units operatively coupled to the processor 112 through the bus 113. These units may include tangible, machine-readable storage media, such as a storage 122. The storage 122 may include media for the long-term storage of operating software and data, such as hard drives. The storage 122 may also include other types of tangible, machine-readable media, such as read-only memory (ROM) and random access memory (RAM). The storage 122 may include the software used in exemplary embodiments of the present techniques.

The storage 122 may include a database management system (DBMS) 124 and a query 128. The DBMS 124 may be a set of computer programs that controls the creation, maintenance, and use of databases by an organization and its end users. The DBMS 124 is described in greater detail with reference to FIG. 1B.

The query 128 may be a relational query language statement for accessing or updating data stored in the DBMS 124. The query 128 may specify tables and columns to access, predicates that specify selection criteria for rows in the tables, and operators that determine the result set of the query 128. For example, operators such as JOIN, GROUP BY, and UNION may be included in the query 128.

Relational query languages may include any query language configured to access and update data stored in a relational database. In an exemplary embodiment, the relational query language statements may be Structured Query Language (SQL) statements.

Through the network 130, several client computers 104 may connect to the database server 102. The client computers 104 may be similarly structured as the database server 102, with exception to the storage of the DBMS 124. In an exemplary embodiment, the client computers 104 may be used to submit the query 128 to the database server 102 for optimization by the DBMS 124.

Figure 1B:
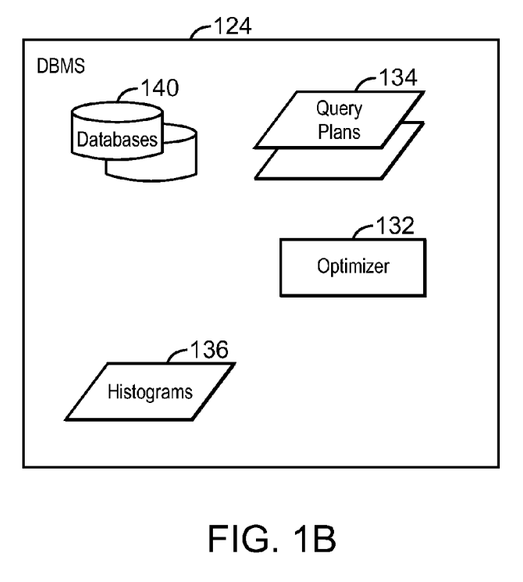
FIG. 1B is a block diagram of a database management system adapted to optimize the query according to an exemplary embodiment of the present invention.

FIG. 1B is a block diagram of the DBMS 124 adapted to optimize the query 128 according to an exemplary embodiment of the present invention. As illustrated, the DBMS 124 may include an optimizer 132, query plans 134, histograms 136, and several databases 140 against which a selected query plan may be executed. The databases 140 may include user data organized into tables, rows and columns, typical of a relational DBMS.

The histograms 136 may be a data store that contains statistics about the data values stored in columns of tables in the databases 140. The statistics may describe intervals of values in a column of Table A shown in Table 1. For example, a Table A, may contain the following values for a column B, as shown in Table 1:

TABLE 1

| TABLE A COLUMN B |
|---|
| 4 |
| 12 |
| 15 |
| 15 |
| 15 |
| 23 |
| 23 |
| 26 |

The histogram 136 for Table A may describe 3 intervals for column B: values from 1-10, values from 11-20, and values from 21-30, as shown in Table 2.

TABLE 2

HISTOGRAM FOR TABLE A, COLUMN B.

| INTERVAL | NUMBER OF ROWS | NUMBER OF VALUES | MAXIMUM FREQUENCY |
|---|---|---|---|
| 1-10 | 1 | 1 | 1 |
| 11-20 | 4 | 2 | 3 |
| 21-30 | 3 | 2 | 2 |

The NUMBER OF ROWS may simply describe the number of rows in the Table A where the column value falls into the particular interval. The NUMBER OF VALUES, however, may describe the number distinct column values within the particular interval. For example, the NUMBER OF VALUES in the 1-10 interval is 1 because there is only one row, and hence, only one value in the interval: 4. The NUMBER OF VALUES in the 11-20 interval is 2, because, while there are 4 rows in the interval, there are only 2 distinct values: 12 and 15.

The MAXIMUM FREQUENCY may describe the number of times that the value that occurs with the highest frequency appears in the table. For example, in the interval 11-20, the value 12 appears once, and the value 15 appears 3 times. Accordingly, the MAXIMUM FREQUENCY for the interval 11-20 is 3. The histogram 136 may be used by the optimizer 132 to generate the query plans 134.

The optimizer 132 may be software that generates the query plan 134, which may specify how to access the data specified by the query 128. In particular, the query plan 134 may implement each operator of the query 128 with a corresponding algorithm. The query plan 134 may be generated to be risk tolerant by selecting the corresponding algorithms based on a maximum cardinality determination. The maximum cardinality may be an upper limit on the total number of rows that may be accessed at runtime.

In an exemplary embodiment of the invention, the optimizer 132 may determine estimates for both the expected and the maximum cardinality, based on the histograms 136 and the query 128. The maximum cardinality estimate may be based on the assumption that the statistics in the histograms 136 are accurate reflections of the actual data.

The risk associated with query plans 134 that become disproportionately long-running may result from an underestimation of cardinality. However, because the query plans 134 generated by the optimizer 132 may be generated based on both the expected and the maximum cardinality, this risk may be avoided because the maximum cardinality may not be exceeded at runtime.

Figure 2:
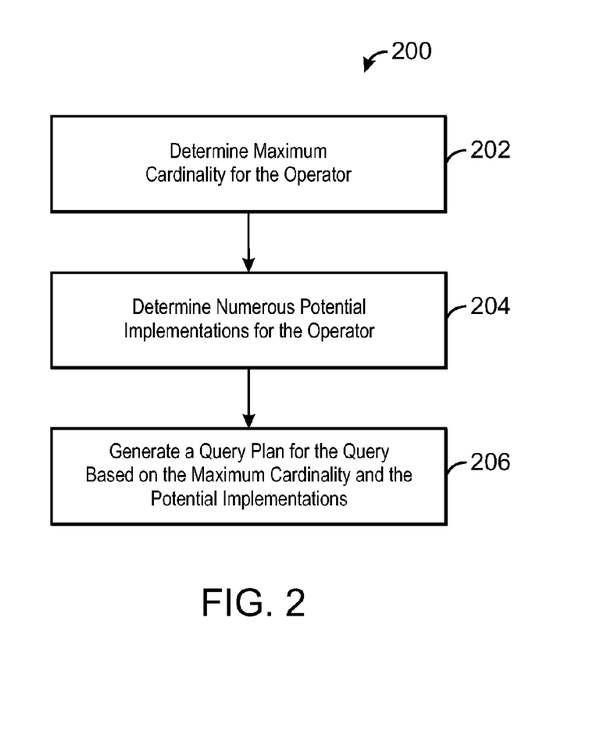
FIG. 2 is a process flow diagram showing a computer-implemented method for optimizing the query according to an exemplary embodiment of the present invention.

FIG. 2 is a process flow diagram showing a computer-implemented method for optimizing the query 128 according to an exemplary embodiment of the present invention. The method is generally referred to by the reference number 200, and may be performed by the optimizer 132 for each operator of the query. It should be understood that the process flow diagram is not intended to indicate a particular order of execution.

The method begins at block 202. At block 202, the optimizer 132 may determine the maximum cardinality for the operator. The maximum cardinality may be computed using a query plan tree in a process similar to that of computing the expected cardinality. The maximum cardinality for leaf scan nodes may be calculated based on maximum selectivity estimates for the local predicates of the scans.

In turn, the maximum cardinality estimates for the operator in the query tree may be computed from the bottom up based on the operator type, logic, and the maximum cardinalities of the child nodes of the operator node.

The maximum cardinality calculation may be based on assumptions favoring the highest potential cardinality. In this way, the actual cardinality at runtime may not exceed the maximum cardinality.

For example, the maximum cardinality for an equality predicate may be based on the frequency of the mode value, i.e., the MAXIMUM FREQUENCY, in an interval of the histogram. The optimizer 132 may assume that the value specified in the equality predicate is the mode value because an equality predicate for the mode value would provide the maximum possible cardinality. For example, consider the SQL statement below:

SELECT*FROM TABLE $A$ WHERE $B$=13

For this SQL statement, the optimizer 132 may determine the maximum cardinality of the equality predicate, B=13. The value, 13, falls in the interval 11-20. The histogram 136 for Table A specifies that the MAXIMUM FREQUENCY for interval 11-20 is 3. As such, the optimizer 132 assumes that 13 is the mode value in the interval 11-20, and calculates the maximum cardinality of this equality predicate to be equal to 3. Estimations of these values may be performed by the methods shown in FIGS. 5 and 6.

FIG. 5 is a table showing maximum selectivity estimates for various predicates that may be used in exemplary embodiments. The maximum selectivity estimate may represent the maximum possible percentage of rows in a table for which the particular predicate may be true. As such, the maximum cardinality for the following predicates may be calculated by multiplying the maximum selectivity estimate by the total number of rows in the table. In FIG. 5, X and Y represent column names.

Each of the predicates may be included within an operator of the query 128. As stated previously, the maximum cardinality may be computed from the bottom-up the query tree. The table shown in FIG. 6 includes sample methods for computing the maximum cardinality for common query tree operators and their associated join predicates. FIG. 6 also includes an explanation for the maximum cardinality estimate for each operator and join predicate.

In FIG. 6, T1 and T2 may represent table names. Additionally, FIG. 6 includes functions: maxCard( ), expCard( ), and maxFreq( ). The function, maxCard(T1), may represent the maximum cardinality of the table T1. Similarly, the function, expCard(T1) may represent the expected cardinality of the table T1. The function, maxFreq(T1), may represent the maximum frequency, as described with reference to the histograms 136.

Returning to FIG. 2, at block 204, the optimizer 132 may determine numerous potential implementations for the operator. For example, an operator may be implemented using one of a number of different algorithms. Some examples of different algorithms may include hash joins, ordered hash joins, and nested joins. Any one of the potential implementations may accomplish the task specified by the operator. However, each of the potential implementations may specify a different way to accomplish the task.

At block 206, the query plan 134 may be generated for the query 128 based on the maximum cardinality and the potential implementations. For example, the query plan 134 generated may include the potential implementation with the lowest processing cost. In an exemplary embodiment of the invention, the processing cost for each potential implementation may be based on both the expected cardinality and the maximum cardinality.

The optimizer 132 may compute the maximum cardinality using sampling methods by applying the predicate(s) on a sample of the data to estimate the selectivity of the predicates on the actual data. In an exemplary embodiment of the invention, the optimizer 132 may compute the maximum cardinality based on the upper bound of a specified confidence interval, e.g. the 99th percentile.

Figure 3:
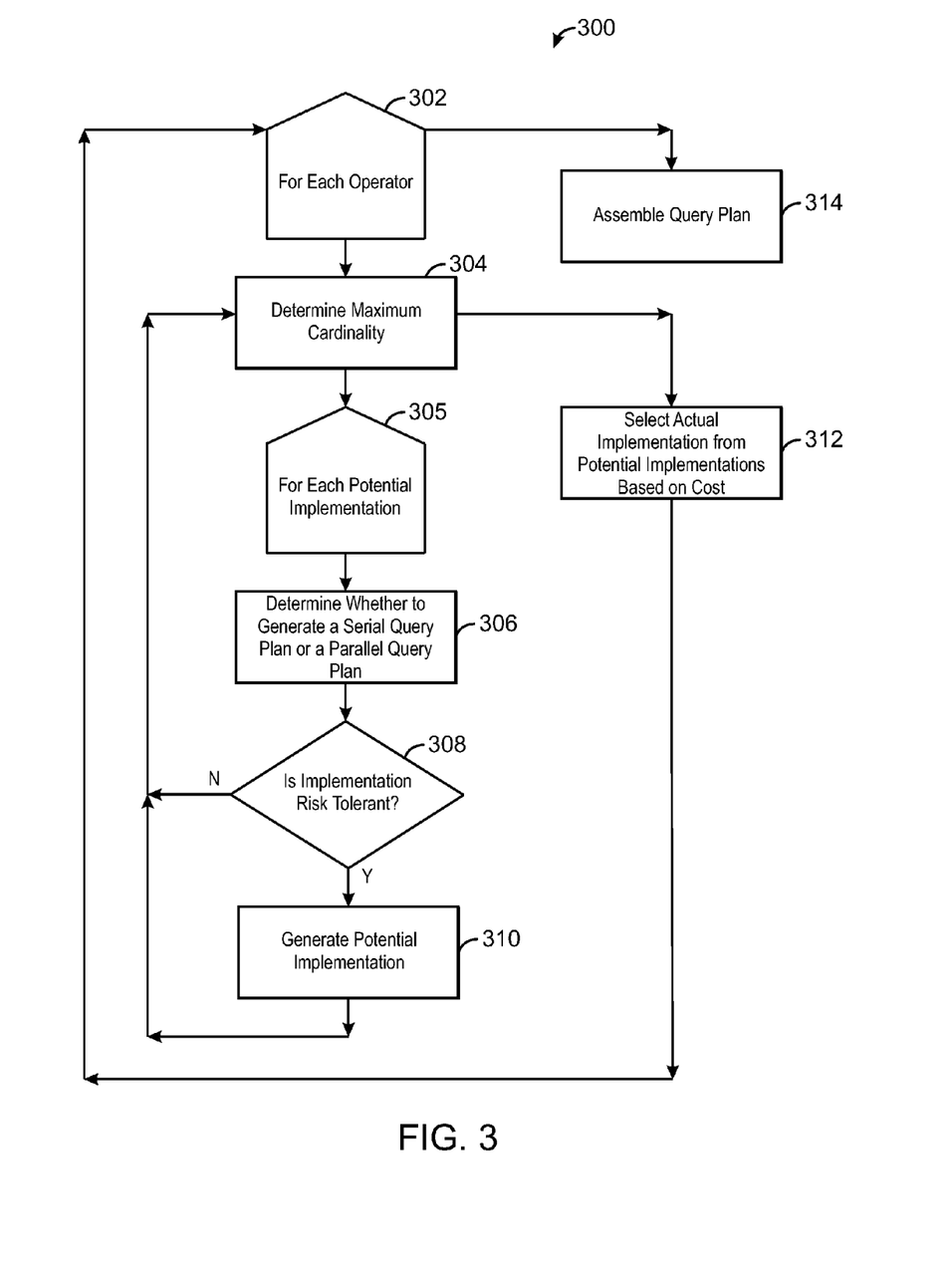
FIG. 3 is a process flow diagram showing a computer-implemented method for optimizing the query according to an exemplary embodiment of the present invention.

FIG. 3 is a process flow diagram showing a computer-implemented method for optimizing the query 128 according to an exemplary embodiment of the present invention. The method is generally referred to by the reference number 300, and may be performed by the optimizer 132. It should be understood that the process flow diagram is not intended to indicate a particular order of execution.

The method begins at block 302. As stated previously, the query may include numerous operators. Accordingly, the optimizer 132 may perform the blocks 302-312 for each operator in the query 128.

At block 304, the optimizer 132 may determine the maximum cardinality for the operator. The maximum cardinality determination may be performed as described with reference to FIG. 2.

The query plan 134 may include only one of a number of potential implementations for each operator. Accordingly, the blocks 305-312 may be performed for each potential implementation.

At block 306, the optimizer 132 may determine whether to generate a serial query plan or a parallel query plan for the potential implementation. In a system with massively parallel processors (MPP), the optimizer 132 may generate query plans 134 that are serial or parallel. The serial plan may include all the tasks for all the operators specified in the query 128, and be performed on a single processor. The parallel plan, on the other hand, may divide the tasks up to be performed in parallel on many different processors.

The parallel plan may provide the benefit of executing in a shorter period of time than the same query executed serially. However, when a relatively small number of rows are accessed, a parallel plan may be a waste of processing time and system resources. In such a case, a serial plan may be more desirable than a parallel plan.

On the other hand, for a relatively large number of rows, a serial plan may take longer to run than a parallel plan. In such a case, a parallel plan may be significantly more efficient than a serial plan. Accordingly, the optimizer 132 may choose to generate serial or parallel plans based on the maximum cardinality of the query 128.

For example, the optimizer 132 may choose to generate serial plans instead of parallel plans if the maximum cardinality of the query 128 is below a specified threshold. The specified threshold may provide a point of demarcation between what the optimizer 132 considers a small number of rows and a large number of rows. As such, the optimizer 132 may safely choose to generate serial plans without risking a long-running query.

At block 308, the optimizer 132 may determine whether the potential implementation is risk tolerant. In other words, may the potential implementation achieve the maximum cardinality without negatively impacting performance of the DBMS? If not, the next potential implementation is considered at block 305.

For example, one potential implementation that may be considered is an ordered hash join. An ordered hash join may be an algorithm that is an efficient, but risky, variation of a hash join. The ordered hash join may use two tables: a build table and a probe table.

An ordered hash join operates under the assumption that the build table fits in memory. As such, the ordered hash join may preserve the sorted property of the probe table. Preserving the sorted property makes the ordered hash join desirable because an additional sort that could be required by a parent merge join or order by operation is not needed.

If the build table fits in memory, the probe table may be probed in one pass, which may facilitate an efficient ordered hash join. What makes the order hash join risky is that the build table may overflow memory. In such a case, the ordered hash join may cause memory thrashing.

In memory thrashing, pages of data are shifted between main memory and a hard drive, resulting in significant delays due to the hard drive accesses. Memory thrashing is an undesirable processing state which may slow the processing of the selected query plan significantly.

Accordingly, the optimizer 132 may determine that an ordered hash join is not risk tolerant if a build table of the maximum cardinality may overflow memory. Similarly, the optimizer 132 may determine that an ordered hash join is risk tolerant if a build table of maximum cardinality may not overflow memory.

Another potential implementation that may be considered is a nested join. The nested join may specify an inner table and an outer table. In the nested join, the inner table may be scanned for each row in the outer table that meets the selection criteria of the query 128. As such, the processing cost of a nested join may increase at a faster rate than that of a hash join as the number of rows accessed from the outer table increases. Accordingly, if the maximum cardinality of the outer table may cause a nested join to exceed multiple times the I/O cost of a single scan of the inner table, then the nested join may not be risk tolerant.

Specifically with regard to a parallel query plan, a particular consideration may be whether to include a replicate broadcast plan. The replicate broadcast may be used to evenly distribute processing load to all instances of the parallel plan.

The replicate broadcast plan may be a join plan where one of the two tables is broadcast to all instances of a parallel join. In the replicate broadcast plan, the table may be broadcast over a network linking the separate processors performing the parallel plan.

As such, if the broadcast table is significantly large, the replicate broadcast plan may overwhelm the network, and bog down the system. Accordingly, the may determine that the replicate broadcast plan is not risk tolerant if the maximum cardinality of the table to be replicated is above a specified threshold. In this manner, the risk of the replicate broadcast plan overwhelming the network may be avoided.

If the optimizer 132 determines that the potential implementation is risk tolerant, at block 310, the optimizer 132 may generate the potential implementation. Once all the potential implementations have been considered, the method may flow to block 312. At block 312, the optimizer 132 may select the actual implementation to be included in the query plan 134 from the potential implementations. Because only risk tolerant plans may be generated, the actual implementation that is selected may be risk tolerant.

The actual implementation may be selected based on the processing costs of all the potential implementations. More specifically, the query plan selection may be based on a balancing of maximum cardinality and expected cardinality. Such a balancing may be accomplished by selecting the query plan 134 with the lowest cost according to the following formula:

$$C=A*E+B*M,$$

where C represents the cost, E represents a cost based on the expected cardinality, and M represents a cost based on the maximum cardinality. A and B may be weights specified according to a preference for balancing the costs based on expected and maximum cardinality, where $A+B=1$, $A \geqq 0$, and $B \geqq 0$. Allowing this balancing may provide a wide spectrum of robustness and risk-tolerance for the optimizer 132, from the classical greedy optimizer (A=1, B=0) to highly risk tolerant strategies as the value of B increases.

Once an actual implementation has been selected for each operator of the query 128, the method 300 may flow to block 314. At block 314, the query plan 134 may be assembled using all the selected actual implementations.

Figure 4:
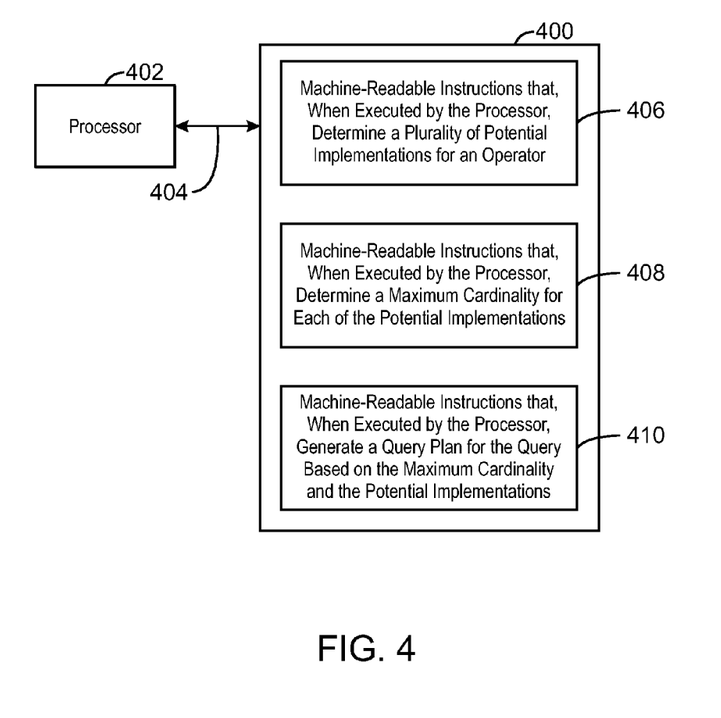
FIG. 4 is a block diagram showing a tangible, machine-readable medium that stores code adapted to optimize the query according to an exemplary embodiment of the present invention.

FIG. 4 is a block diagram showing a tangible, machine-readable medium that stores code adapted to facilitate optimizing the query 128 according to an exemplary embodiment of the present invention. The tangible, machine-readable medium is generally referred to by the reference number 400. The tangible, machine-readable medium 400 may correspond to any typical storage device that stores computer-implemented instructions, such as programming code or the like. For example, the medium may be flash medium, an optical disk, a hard drive, Moreover, tangible, machine-readable medium 400 may be included in the storage 122 shown in FIG. 1. When read and executed by a processor 402, the instructions stored on the tangible, machine-readable medium 400 are adapted to cause the processor 402 to optimize the query 128.

A region 406 of the tangible, machine-readable medium 400 stores machine-readable instructions that, when executed by the processor 402, determine a plurality of potential implementations for an operator.

A region 408 of the tangible, machine-readable medium 400 stores machine-readable instructions that, when executed by the processor 402, determine a maximum cardinality for each of the potential implementations.

A region 410 of the tangible, machine-readable medium 400 stores machine-readable instructions that, when executed by the processor 402, generate a query plan for the query based on the maximum cardinality and the potential implementations.

What is claimed is:

1. A computer-implemented method of optimizing a query, comprising:
   determining, using a computing system, a maximum cardinality for an operator, wherein the query comprises the operator;
   determining, using the computing system, a plurality of potential implementations for the operator; and
   generating, using the computing system, a query plan for the query based on the maximum cardinality and the potential implementations,
   wherein generating the query plan comprises determining a processing cost for each of the potential implementations, the processing cost being based on the maximum cardinality and an expected cardinality of the potential implementations, and selecting an actual implementation from the plurality of potential implementations for inclusion in the query plan based on the processing cost,
   wherein the processing cost comprises a value equal to $A*E+B*M$, wherein E represents a cost based on the expected cardinality, M represents a cost based on the maximum cardinality, A is a first specified weight, B is a second specified weight, $A+B=1$, $A \geqq 0$, and $B \geqq 0$.

2. The method recited in claim 1, wherein the maximum cardinality is a maximum number of rows that may be accessed from a table specified by the operator.

3. The method recited in claim 2, wherein determining the maximum cardinality comprises applying a predicate of the operator to a sampling of data in the table.

4. The method recited in claim 1, wherein the potential implementations comprise algorithms that specify how to access data specified by the query.

5. The method recited in claim 1, wherein the maximum cardinality is determined based on a histogram for a table specified in the query.

6. The method recited in claim 1, wherein the maximum cardinality is determined based on a predicate of the operator.

7. The method recited in claim 1, wherein the potential implementations comprise an ordered hash join that generates a build table, wherein the build table of the maximum cardinality fits within a limited memory space, and wherein the query plan comprises the ordered hash join.

8. The method recited in claim 1, wherein the potential implementations comprise a nested join, wherein the nested join specifies an inner table and an outer table, wherein the maximum cardinality is a maximum cardinality of the outer table, and wherein the maximum cardinality is less than a total number of rows of the inner table.

9. The method recited in claim 1, wherein the potential implementations comprise a serial query plan and a parallel query plan, and wherein the query plan comprises the serial query plan when the maximum cardinality is below a specified threshold.

10. The method recited in claim 1, wherein the potential implementations comprise a serial query plan and a parallel query plan, and wherein the query plan comprises the parallel query plan when the maximum cardinality is above a specified threshold.

11. The method recited in claim 1, wherein the potential implementations comprise a replicate broadcast plan comprising a broadcast table, wherein the broadcast table is broadcast to all instances of a parallel join at runtime, wherein the query plan comprises the replicate broadcast plan, wherein the maximum cardinality is a maximum cardinality of the broadcast table, and wherein the maximum cardinality is below a specified threshold.

12. A computer system for optimizing a query in a database management system (DBMS), the computer system comprising:
a processor that is configured to execute stored instructions; and
a memory device that stores instructions, the memory device comprising:
computer-implemented code configured to determine a maximum cardinality for each of a plurality of operators specified in the query;
computer-implemented code configured to determine a plurality of potential implementations for each of the operators; and
computer-implemented code configured to generate a query plan for the query based on the maximum cardinality and the potential implementations,
wherein the computer-implemented code configured to generate the query plan comprises computer-implemented code to determine a processing cost for each of the potential implementations, the processing cost being based on the maximum cardinality and an expected cardinality of the potential implementations, -and to select an actual implementation from the plurality of potential implementations for inclusion in the query plan based on the processing cost,
wherein the processing cost comprises a value equal to $A*E+B*M$, wherein E represents a cost based on the expected cardinality, M represents a cost based on the maximum cardinality, A is a first specified weight, B is a second specified weight, $A+B=1$, $A\geq 0$, and $B\geq 0$.

13. The computer system recited in claim 12, wherein the computer-implemented code configured to generate the query plan comprises computer-implemented code configured to select an actual implementation for each of the operators from the potential implementations, and wherein the query plan comprises the selected actual implementations.

14. The computer system recited in claim 12, wherein the potential implementations comprise an ordered hash join that generates a build table, wherein the build table of the maximum cardinality fits within a limited memory space, and wherein the ordered hash join is selected from the potential implementations.

15. A non-transitory, machine-readable medium that stores machine-readable instructions executable by a processor to optimize a query in a database management system (DBMS), the non-transitory, machine-readable medium comprising:
machine-readable instructions that, when executed by the processor, determine a maximum cardinality for an operator, wherein the query comprises the operator;
machine-readable instructions that, when executed by the processor, determine a plurality of potential implementations for the operator; and
machine-readable instructions that, when executed by the processor, generate a query plan for the query based on the maximum cardinality and the potential implementations,
wherein the machine-readable instructions that generate the query plan comprise machine-readable instructions to determine a processing cost for each of the potential implementations, the processing cost being based on the maximum cardinality and an expected cardinality of the potential implementations, and to select an actual implementation from the plurality of potential implementations for inclusion in the query plan based on the processing cost,
wherein the processing cost comprises a value equal to $A*E+B*M$, wherein E represents a cost based on the expected cardinality, M represents a cost based on the maximum cardinality, A is a first specified weight, B is a second specified weight, $A+B=1$, $A\geq 0$, and $B\geq 0$.

16. A method comprising:
determining, using a computing system, a plurality of potential implementations for an operator that is included in a query;
determining, using the computing system, estimated processing costs associated with the plurality of potential implementations, the estimated processing costs including an expected cost that corresponds to an expected cardinality of an implementation and a maximum cost that corresponds to a maximum cardinality of the implementation; and
selecting, using the computing system, a lowest cost implementation from among the plurality of potential implementations for inclusion in a query plan for the query, the lowest cost implementation corresponding to a potential implementation having a lowest estimated processing cost,
wherein the processing costs associated with the plurality of potential implementations comprise a value equal to $A*E+B*M$, wherein E represents a cost based on the expected cardinality, M represents a cost based on the maximum cardinality, A is a first specified weight, B is a second specified weight, $A+B=1$, $A\geq 0$, and $B\geq 0$.

* * * * *

UNITED STATES PATENT AND TRADEMARK OFFICE
CERTIFICATE OF CORRECTION

PATENT NO. : 8,380,699 B2
APPLICATION NO. : 12/554254
DATED : February 19, 2013
INVENTOR(S) : Awny K. Al-Omari et al.

Page 1 of 1

It is certified that error appears in the above-identified patent and that said Letters Patent is hereby corrected as shown below:

In the Specifications:

In column 1, line 66, delete "maxiumum" and insert -- maximum --, therefor.

In column 1, line 66, delete "ecemplary" and insert -- exemplary --, therefor.

In the Claims:

In column 9, line 31, in Claim 12, delete "-and" and insert -- and --, therefor.

Signed and Sealed this
Twenty-eighth Day of May, 2013

Teresa Stanek Rea
*Acting Director of the United States Patent and Trademark Office*